(12) United States Patent
Kalpin et al.

(10) Patent No.: US 9,401,894 B2
(45) Date of Patent: *Jul. 26, 2016

(54) PROXIMITY SIGNATURE FOR SECURE COMMUNICATION WITH IMPLANTABLE MEDICAL DEVICE

(71) Applicant: MEDTRONIC, INC., Minneapolis, MN (US)

(72) Inventors: Scott L. Kalpin, Harris, MN (US); Patrick S. Leong, Chatsworth, CA (US); Scott A. Sarkinen, Greenfield, MN (US); Earle T. Roberts, Maple Grove, MN (US); William J. Mitchell, Eden Prairie, MN (US)

(73) Assignee: MEDTRONIC, INC., Minneapolis, MN (US)

( * ) Notice: Subject to any disclaimer, the term of this patent is extended or adjusted under 35 U.S.C. 154(b) by 205 days.

This patent is subject to a terminal disclaimer.

(21) Appl. No.: 14/170,709

(22) Filed: Feb. 3, 2014

(65) Prior Publication Data

US 2014/0153719 A1    Jun. 5, 2014

Related U.S. Application Data

(63) Continuation of application No. 12/108,862, filed on Apr. 24, 2008, now Pat. No. 8,682,437.

(60) Provisional application No. 60/974,904, filed on Sep. 25, 2007.

(51) Int. Cl.
*A61N 1/08* (2006.01)
*H04L 29/06* (2006.01)
*H04L 9/08* (2006.01)

(52) U.S. Cl.
CPC .............. *H04L 63/0428* (2013.01); *A61N 1/08* (2013.01); *H04L 9/0819* (2013.01); *H04L 2209/88* (2013.01)

(58) Field of Classification Search
CPC ............ A61N 1/3752; A61N 1/37264; A61N 1/37282; A61N 1/372; A61N 1/08; H04L 63/0428; H04L 9/0819; H04L 2209/88
USPC ................................................ 607/30, 31, 32
See application file for complete search history.

(56) References Cited

U.S. PATENT DOCUMENTS 8,682,437 B2 *   3/2014   Kalpin ..................... A61N 1/08
                                                              607/31
2003/0114897 A1 *  6/2003   Von Arx ............. A61N 1/37223
                                                              607/60

\* cited by examiner

*Primary Examiner* — Christopher D Koharski
*Assistant Examiner* — Michael Carey
(74) *Attorney, Agent, or Firm* — Beth L. McMahon

(57) ABSTRACT

Systems, devices and methods employing coded magnetic fields or transfer of encryption key information via proximity telemetry are described. The systems, methods and devices help prevent or reduce unintended or unintentional distance telemetry communication between an external medical device and an implantable medical device.

20 Claims, 7 Drawing Sheets

PROXIMITY SIGNATURE FOR SECURE COMMUNICATION WITH IMPLANTABLE MEDICAL DEVICE

RELATED APPLICATION

This application is a continuation of, and claims priority to, U.S. patent application Ser. No. 12/108,862, filed Apr. 24, 2008, entitled "Proximity Signature for Secure Communication with Implantable Medical Device", now issued as U.S. Pat. No. 8,682,437, which claims priority to, and the benefit of, U.S. Provisional Application Ser. No. 60/974,904, filed Sep. 25, 2007, both of which are incorporated herein by reference in their entireties.

FIELD OF THE INVENTION

This disclosure relates, inter alia, to implantable medical devices; more particularly to secure communication between implantable medical devices and external devices.

BACKGROUND OF THE INVENTION

Medical devices implanted in patients may communicate with devices external to the patients via distance telemetry, such as radio frequency telemetry. Such distance telemetry communications do not require the external device, such as a programmer, to be located in close proximity to the patient, and thus are more convenient than proximity telemetry communications. While distance telemetry provides convenience to the communication process, security and unintentional access is a concern. For example, it may be possible that multiple implanted devices are within telemetric range of an external programming device. If a device implanted in one patient receives therapeutic instructions intended for a device implanted in another patient, the consequences could be dire. By way of another example, it may be possible for unauthorized parties to eavesdrop on such distance telemetric communications or to send unauthorized communications to an implanted device. Accordingly, there is a need to provide more secure communication associated with distance telemetry with implantable medical device.

BRIEF SUMMARY OF THE INVENTION

The present disclosure presents methods, systems, and devices that provide more secure transmission between an external device and an implantable medical device.

In an embodiment, a method associated with establishing secure communication between an implantable medical device and an external device is described. The method is performed by the implantable medical device and includes receiving a first distance telemetry request for secure distance communication. The method further includes (i) determining whether a coded proximity telemetry signal is being received and (ii) transmitting, via proximity telemetry, information regarding an encryption key if the coded proximity telemetry signal has not been received. The method may further include determining whether a second distance telemetry communication containing information encrypted according to the encryption key is being received. The method may further include accepting the request for secure distance communication if the second distance telemetry communication contains information encrypted according the encryption key.

In an embodiment, a method associated with establishing secure communication between an implantable medical device and an external device is described. The method is performed by the implantable medical device and includes (i) receiving a first distance telemetry request for secure distance communication and (ii) transmitting, via proximity telemetry, information regarding an encryption key. The method further includes determining whether a second distance telemetry communication containing information encrypted according to the encryption key is being received. If the second distance telemetry communication contains information encrypted according the encryption key, the method further includes accepting the request for secure distance communication.

In an embodiment, a method associated with establishing secure communication between an implantable medical device and an external device is described. The method is performed by the implantable medical device and includes receiving a first distance telemetry request for secure distance communication and determining whether a coded proximity telemetry signal is being received. The coded proximity telemetry signal includes a coded magnetic field. The method further includes accepting the request for secure distance communication if coded proximity telemetry signal has been received.

In an embodiment, an implantable medical device is described. The device includes a radio frequency transceiver module, an inductive receiver module, and a processor. The processor is operably coupled to the radio frequency transceiver module and the inductive receiver module. The processor is configured to compare signals received by the radio frequency transceiver module and the inductive receiver module to determine whether the signal received by the inductive receiver module is coded in a manner prescribed by the signal received by the radio frequency transceiver module. The inductive receiver module may be a part of an inductive transceiver module.

In an embodiment, an implantable medical device is described. The device includes a radio frequency transceiver module, an inductive transmitter module, and a processor operably coupled to the radio frequency transceiver module and the inductive transmitter module. The processor is to cause the inductive transmitter module to transmit a signal containing information regarding an encryption key and is configured to determine whether a signal received via the radio frequency transceiver is encrypted according to the encryption key. The inductive transmitter module may be a part of an inductive transceiver module.

In an embodiment, an external medical device capable of communicating with an implantable medical device is described. The external device includes a radio frequency transceiver module, an inductive receiver module, and a processor operably coupled to the radio frequency transceiver module and the inductive transmitter module. The processor is configured to cause the radio frequency module to transmit information encrypted according to encryption key information received from the inductive receiver module. The inductive receiver module may be a part of an inductive transceiver module.

In an embodiment, an external medical device capable of communicating with an implantable medical device is described. The external device includes a radio frequency transceiver module, an inductive transmitter module, and a processor operably coupled to the radio frequency transceiver module and the inductive transmitter module. The processor is configured to cause the inductive transmitter module to transmit a coded magnetic field.

By providing devices, systems and methods that provide more secure transmission between external devices and implantable medical devices, unintended or unwarranted programming of the implantable devices may be avoided or minimized. This and other advantages will be readily understood from the following detailed descriptions when read in conjunction with the accompanying drawings.

The drawings are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION OF THE INVENTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It will be understood that, as used herein, information or signals that "are being received" by a device include information or signals that "have been received" by the device, as long as the time frame of the past receipt is relevant to the secure communication procedure at issue.

The present disclosure describes, inter alia, methods, systems and devices that provide more secure transmission between external devices and implantable medical devices. By providing more secure transmission, unintended or unwarranted programming of the implantable devices may be avoided or minimized.

The teachings of the present disclosure may be applied to any implantable infusion device capable of telemetric communication via both distance and proximity telemetry. For example, the infusion device may be an implantable signal generator, such as a cardiac defibrillator, a cardiac pacemaker, a neurostimulator, a gastric stimulator, or the like; an implantable monitoring device; an implantable infusion device; or the like.

The teachings of the present disclosure may also be applied to any external device capable of telemetrically communicating with an implantable medical device. For example, external device may be a programmer device, a monitoring device, or the like.

Figure 1:
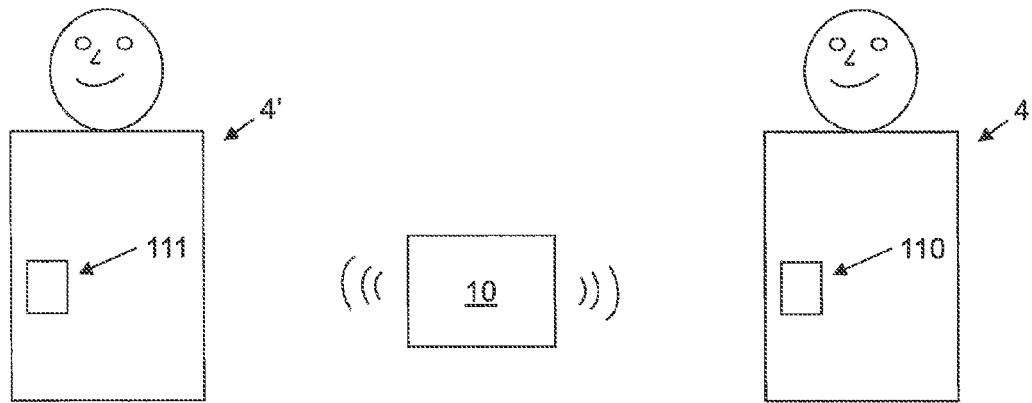
FIGS. 1-4 are schematic diagrams of scenarios depicting unintended or unwarranted communication between external devices and devices implanted in a patient.

Referring to FIG. 1, a schematic diagram of a scenario in which an external device 10 capable of communicating via distance telemetry with more than one implantable device 110, 111 implanted in patients 4, 4' is shown. As shown in the depicted diagram, without any security or proximity measures, external device 10 can communicate with either of the implantable devices 110, 111. However, in most situations, external device 10 is intended to communicate with only one of the implanted devices 110, 111 at a given time. For example, external device 10 may be a programmer device attempting to send therapy instructions to implantable device 110 that are tailored to treating patient 4. If implantable device 111 were to receive the therapy instructions intended for device 110, serious adverse consequences for patient 4' could result.

Figure 2:
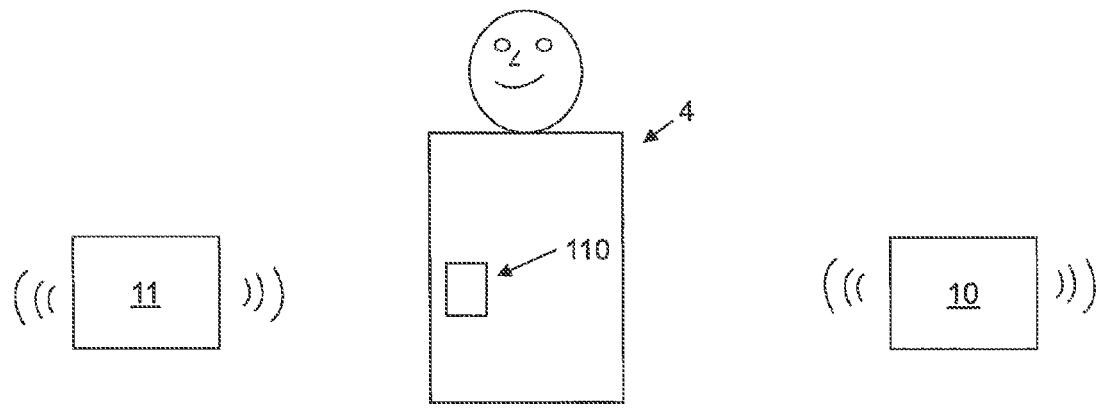

Referring to FIG. 2, a schematic diagram of a scenario in which more than one external device 10, 11 capable of communicating via distance telemetry with an implantable medical device 110 implanted in a patient 4 is shown. In the depicted diagram, both external device 11 and external device 10 are within range for telemetric communication with implanted device 110. However, in the depicted embodiment, only external device 10 is intending to communicate with implantable device 110. Without any security or proximity measures, unintended communication between external device 11 and implanted device 110 may occur.

Figure 3:
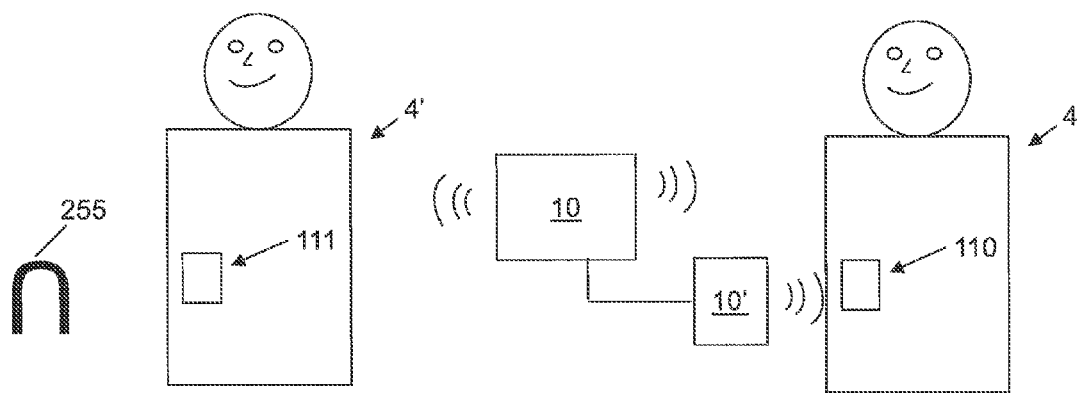

Referring to FIG. 3, a scenario in which a system capable of proximity and distance telemetry is schematically depicted. In the depicted embodiment, external device 10 is capable of distance communication with implantable device 110 implanted in patient 4 and implantable device 111 implanted in patient 4'. External device 10' is capable of proximity telemetry with implantable devices 110, 111 through an inductive magnetic field. External proximity device 10' is operably coupled to external distance device 10 in the depicted embodiment, and may be, for example, a programming head. External proximity device 10' is positioned in proximity to patient 4 at a location near where implantable device 110 is implanted. Upon detecting the magnetic field generated by proximity device 10', implantable device 110 initiates distance telemetry communication with external distance device 10. Due to the addition of the proximity measure, such systems provide additional assurance, relative to systems as described with regard to FIGS. 1-2, that only the intended implantable device 110 will communicate via distance telemetry with the external device 10.

However, the depicted system is not entirely free from unintended communication without further security measures. As with implantable device 110, implantable device 111 will initiate distance telemetry communication with external distance device 10 upon detection of a magnetic field. In the depicted embodiment, patient 4', and thus implanted device 111, are in the presence of a magnet 255 capable of producing a magnetic field detectable by implantable device 111. The magnetic field may be from, e.g., an MRI instrument. Thus, unintended communication may occur between external distance device 10 and implanted device 111 when implanted device 111 is in the presence of magnet 255 and within range of distance device 10. If distance device 10 is intending to send device 110 implanted in patient 4 instructions regarding therapeutic procedures, unintended communication between external distance device 10 and implanted device 111 may provide serious consequences to patient 4'.

Figure 4:
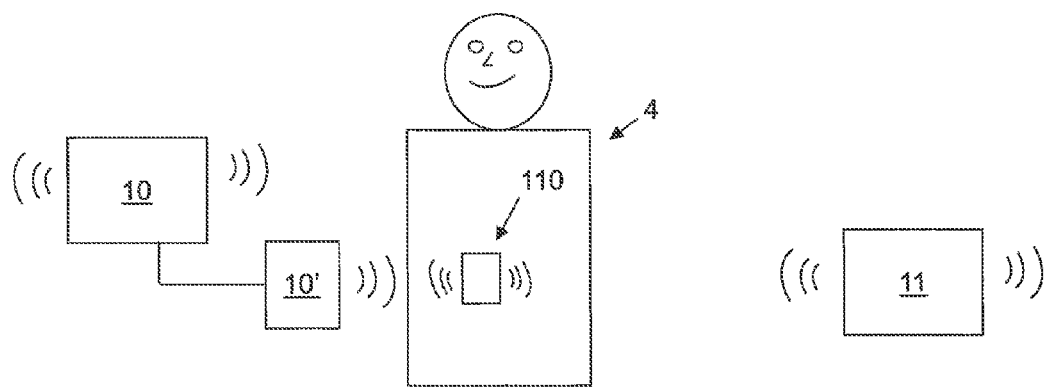

Referring now to FIG. 4, another scenario of unintended or unwarranted distance telemetry communication is schematically depicted. As discussed with regard to FIG. 3, proximity external device 10' is positioned near patient 4 at a location in proximity to implanted device 110. Implanted device 110 detects a magnetic field emitted from device 10' and then initiates communication via distance telemetry with external device 10. In the scenario depicted in FIG. 4, external device 11 is capable of receiving distance telemetry communications transmitted from implantable device 110 or sending communications to implantable device 110. Without appropriate security measures, external device 11 may eavesdrop on the communications between implantable device 110 and external device 10. Alternatively or in addition, external device 11 may actively and unintentionally or unwarrantedly communicate with implantable device 110.

While it will be understood that many other scenarios may exist where unintentional or unwarranted distance telemetric communication with an implantable medical device may occur and that the devices, systems and methods described herein may address one or more of such scenarios, the discussion that follows will refer to the scenarios presented in, and described above with regard to, FIGS. 1-4, particularly FIGS. 3-4, for the sake of convenience and clarity.

Figure 5:
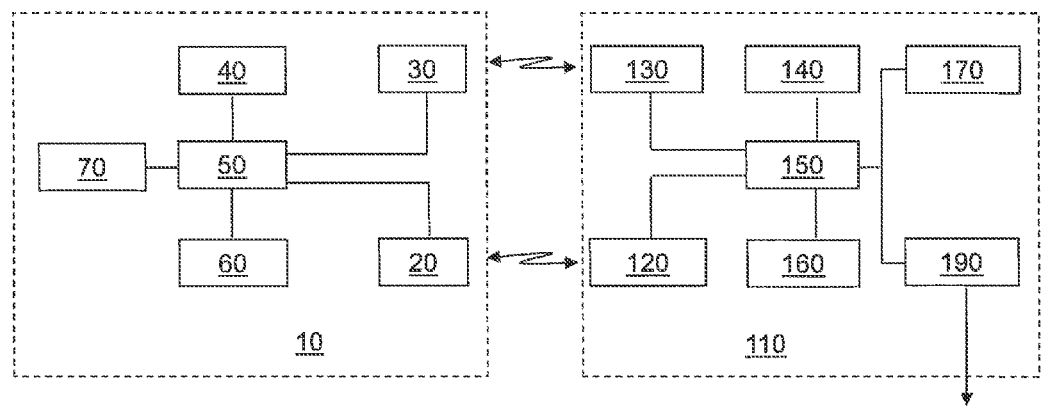
FIGS. 5-6 are schematic block diagrams of representative systems.
Figure 6:
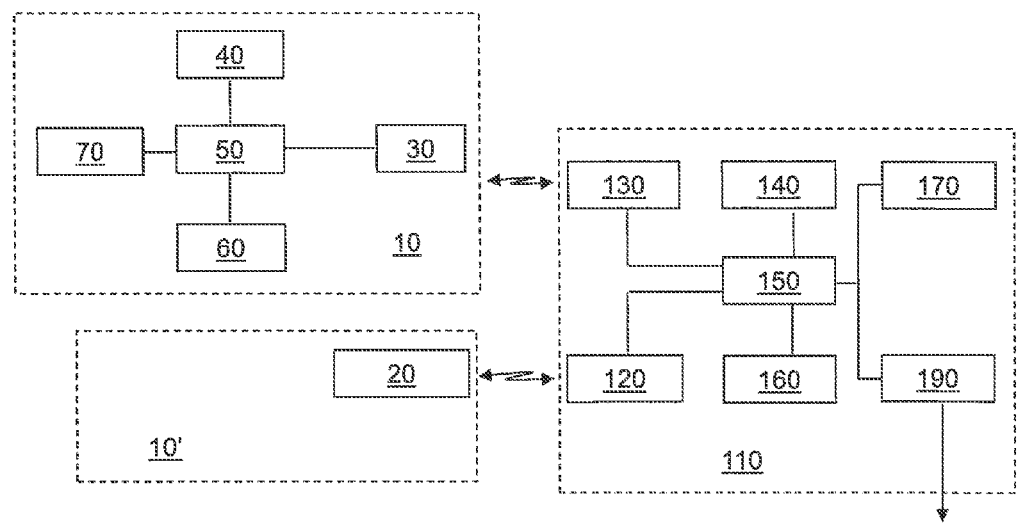

Referring now to FIGS. 5 and 6, schematic block diagrams of systems capable of proximity and distance telemetry are shown. The system includes an implantable medical device 110 having a hermetically sealed housing containing various operative components and is configured to be implanted in a patient. Device components provided to operate the implantable medical device 110 will vary depending upon the type of device and may include, for example, a pulse generator, capacitors, leads, sensors, accelerometers, pumping mechanisms, reservoirs, and various other components. In addition to a distance telemetry module 130 and a proximity telemetry module 120, a processor 150, power source 140, memory 160, clock 170, and therapy output module 190 are typically provided.

Processor 150 may be synchronous and typically operates on low power, such as Motorola 68HC11 synthesized core operating with a compatible instruction set. Clock 170 may date/time stamp events and may be used for therapy control. Memory 160 includes memory sufficient for operation of device 110, such as volatile Random Access Memory CRAM) for example static RAM, nonvolatile Read Only Memory (ROM), Electrically Erasable Programmable Read Only Memory (EEPROM) for example Flash EEPROM, and register arrays configured on Application Specific Integrated Circuits (ASICs), Direct Memory Access (DMA) may be available to selected modules such as telemetry modules 120, 130 so that the selected modules can request control of a data bus and write data directly to memory 160 bypassing processor 150.

Therapy output module 190 refers to components for carrying out the delivery or generation of therapeutic output to be delivered to a patient from implantable device 110. One of skill in the art will appreciate that the components may vary on a device-by-device basis and a therapy-by-therapy basis. For example, therapy module 190 may contain an oscillator if implantable medical device 110 is an electrical signal generator and may contain a pumping mechanism if device 110 is an infusion device.

Other components of implantable medical device 110 can include, e.g., a system reset module, diagnostics module, sensor module or recharge module (not shown). In various embodiments, all components except the power source 140, which may be a battery, can be configured on one or more ASICs or may be one or more discrete components, or a combination of both. In various embodiments, all components, except the clock and power source may be connected to a bi-directional data bus that is non-multiplexed with separate address and data lines.

Distance telemetry module 130 may include a transmitter, receiver, antenna, processor or other components necessary or desirable for carrying out distance telemetric communication. Distance telemetry typically refers to communications via radio frequency (RF) signals and includes telemetry M and telemetry C platforms. In general, distance telemetry communication may take place at distances of one meter or more, more typically over the range of about 3-20 meters. Of course, components of distance telemetry systems may communicate at distances of less than one meter. Distance telemetry modules are generally known in the art and various aspects are described in, for example, U.S. Pat. No. 6,240,317 issued to Villaseca et al. (May 29, 2001), and U.S. Pat. No. 6,482,154 issued to Haubrich et al. (Nov. 19, 2002).

Proximity telemetry module 120 may include a transmitter, receiver, antenna, processor or other components necessary or desirable for carrying out proximity telemetric communication. An example of proximity telemetry is inductive coupling, in which case proximity telemetry module 120 includes an inductive coil. Proximity telemetry modules are generally known in the art and are further detailed in, for example, U.S. Pat. No. 5,752,977 issued to Grevious, et al. (May 19, 1998).

It will be appreciated that a transceiver may be a discrete component that performs the functions of both the receiver and transmitter, and that the use of the latter terms will include the former.

The system may include one or more external devices 10, 10', which may be configured in a variety of ways. In the embodiment depicted in FIG. 5, external device 10 includes both a distance telemetry module 30 configured to communicate with implantable device 110 via telemetry module 130 and a proximity telemetry module 20 configured to communicate with implantable device 110 via telemetry module 120. Distance telemetry module 30 and proximity telemetry module 20 may include components as described above with regard to distance telemetry 130 and proximity telemetry 120 modules of implantable device 110. External device 10 may also include a processor 50, power source 40, memory 60, clock 70, or any other component necessary or desirable for operation of external device, including a display, a data input module, or the like.

In the embodiment depicted in FIG. 6, the system includes an external device 10' containing proximity telemetry module 20. External device 10' is separate from external device 10, which includes distance telemetry module 30. In various embodiments, external device 10' is a component of external device 10, but devices 10, 10' are contained in different housings. For example, external device 10' may be a programming head and telemetry module 20 may be operably coupled to processor 50 wirelessly or via wired mechanism. While not shown, it will be understood that external device 10' may include other components necessary or desirable for operation of external device, regardless of whether external device 10' is operably coupled to external device 10.

It will be understood that the components, devices and systems described with regard to FIGS. 1-6 are but examples of components, devices and systems that may be employed to engage in more secure distance communication with an implantable medical device. However, for the sake of convenience, the discussion that follows with regard to FIGS. 7-11 will refer to devices and components as described with regard to FIGS. 1-6.

Figure 7:
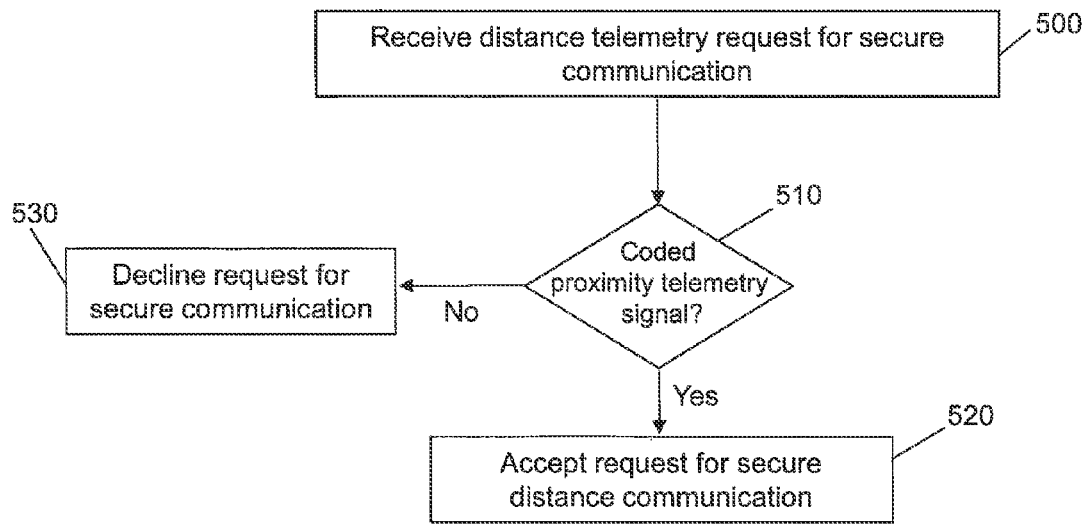
FIGS. 7-11 are flow diagrams of representative methods.

Referring to FIG. 7, a flow diagram of a method for establishing a secure distance telemetry communication is shown.

The method includes receiving a distance telemetry signal from an external device 10 (500). The signal may be received via distance telemetry module 130 of implantable device 110. The signal may include an active request for secured communication from an external device 10 or may contain a request for which the implantable device 110 is programmed to recognize as requiring secured communication, such as, for example, a request for patient specific information or information regarding therapy parameters, a request to program the implantable device 110, instructions to modify therapy parameters of the implantable device 110, or the like. A determination is then made as to whether a coded proximity telemetry signal is being received (510). For example, upon receiving the distance telemetry signal via distance telemetry module 130, processor 150 may monitor proximity telemetry module 120 to determine whether a coded signal is being received. The coded signal, in the case of inductive coupling proximity telemetry, is a distinctive magnetic field signature. The parameters that can be varied include the clock rate of the field and the duty cycle of the field. The coded field may comprise a distinctive low speed variation, such as an on-off key at a predetermined rate. If the duty cycle is varied, it may be desirable for it to be varied by other than 50% to make it more difficult to unintentionally or unwarrantedly duplicate the coded signature.

The distinctive feature of the coded field may be preprogrammed into the implantable device 110. In such circumstances, processor 150 may compare features of a signal received by proximity telemetry module 120 to one or more distinctive signatures stored in memory 160 to determine whether the proximity telemetry signal is appropriately coded. Alternatively, or in addition, information regarding the coding of the proximity signal may be provided in the distance telemetry request for secure communication. Processor 150 may determine whether information received via distance telemetry module 130 regarding the coding of proximity telemetry signal matches the coding signature actually being received via proximity telemetry module to determine whether an appropriately coded proximity telemetry signal is being received (510).

If a properly coded signal is being received, the implantable device 110 may then accept the request for secure communication and establish distance telemetry communication with the external device 10 (520). If processor 150 determines that the proximity telemetry signal is not properly coded, secured distance communication may be declined (530). By declining secured distance communication, the implantable device may send to external device 10, via distance telemetry module 130, formal notice of declining, may fail to respond to the external device 10, or the like.

Figure 8:
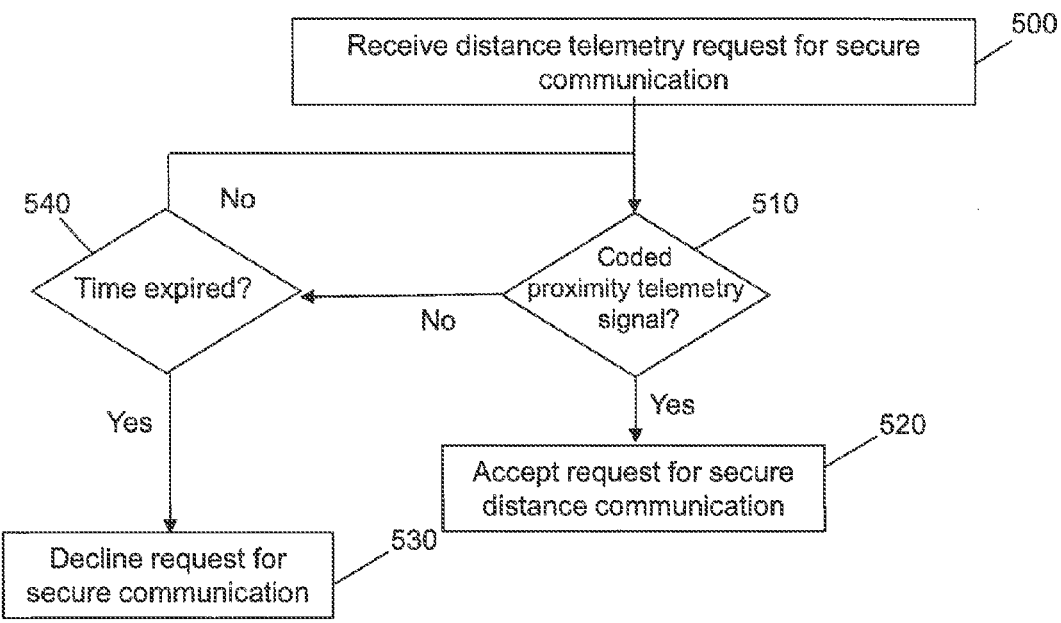

As depicted in FIG. 8, implantable device 110 may determine whether a preset amount of time has expired (540) before declining the request for secure distance telemetry communication (530). For example, clock 170 may time stamp the receipt of the initial request for distance telemetry communication (500) and processor 150 may determine whether sufficient time has passed without receiving an appropriately coded proximity telemetry signal before declining the request for distance telemetry secure communication.

By introducing the security measure of a coded proximity signal as described with regard to FIGS. 7 and 8, the scenario of unintended communication with or programming of unintended implantable device 111 as discussed with regard to FIG. 3 may be avoided or minimized.

Of course, it will be understood that upon receipt of a distance telemetry request for secure communication, the implantable device 110 may produce via proximity telemetry module 120 the coded field that is received by proximity telemetry module 20 of external device 10 (or external proximity device 10' operably coupled to external distance device 10), as opposed to the coded signal being received by the implantable device 110. Following receipt of the coded field, external device 10 may initiate secure transmission. Initiation of secure transmission may include the exchange of an encryption key either via distance or proximity telemetry, which will be discussed in more detail below.

Figure 9:
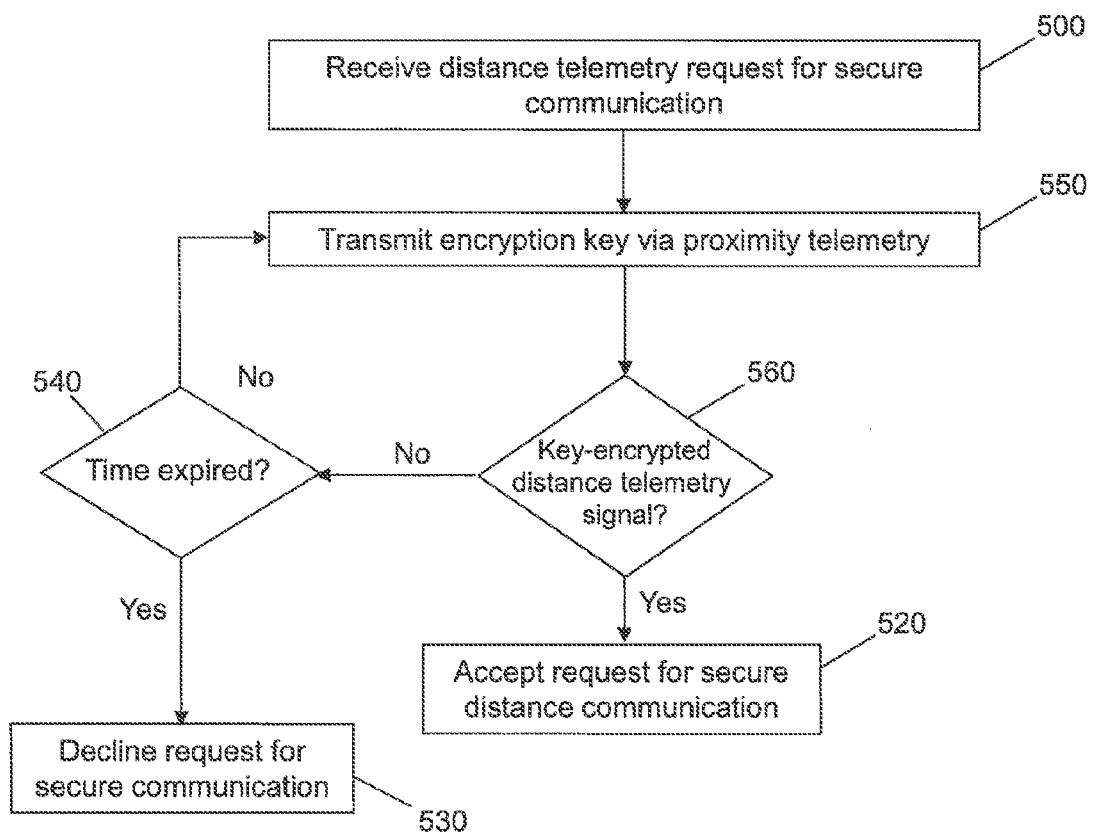

Referring now to FIG. 9, a flow diagram of an illustrative method for establishing a secure distance telemetry communication is shown. Upon receipt of a distance telemetry request for secure communication (500), e.g. as discussed above with regard to FIG. 7, implantable device 110 may transmit information regarding an encryption key to external device 10, (or external proximity device 10' operably coupled to external distance device 10), via proximity telemetry module 120 (550). Processor 50 of external device 10, upon receiving the information regarding the encryption key from proximity telemetry module 20 may cause distance telemetry module 30 to encrypt transmitted information. Implantable device 110 can then determine whether properly encrypted information is being received (560), via distance telemetry module 130. If the signal received via distance telemetry module 130 is properly encrypted, the implantable device 110 may accept the request for secure communication and establish distance telemetry communication with the external device 10 (520). If the implantable device 110 does not receive a properly encrypted distance telemetry signal within a predetermined amount of time (540), the request for secure communication may be declined (530), e.g. as described with regard to FIG. 7.

By introducing the security measure of transfer of an encryption key via proximity telemetry, as described with regard to FIG. 9, the scenario of unintended communication with or programming of unintended implantable device 111 as discussed with regard to FIG. 3 may be avoided or minimized. In addition the scenario of unintended or unwarranted communication as discussed with regard to FIG. 4 may also be eliminated or minimized. Of course, it will be understood that the encryption key may be transmitted by the external device via proximity telemetry module 20 and received by implantable device 110 to avoid unwarranted or unintended communication.

Figure 10:
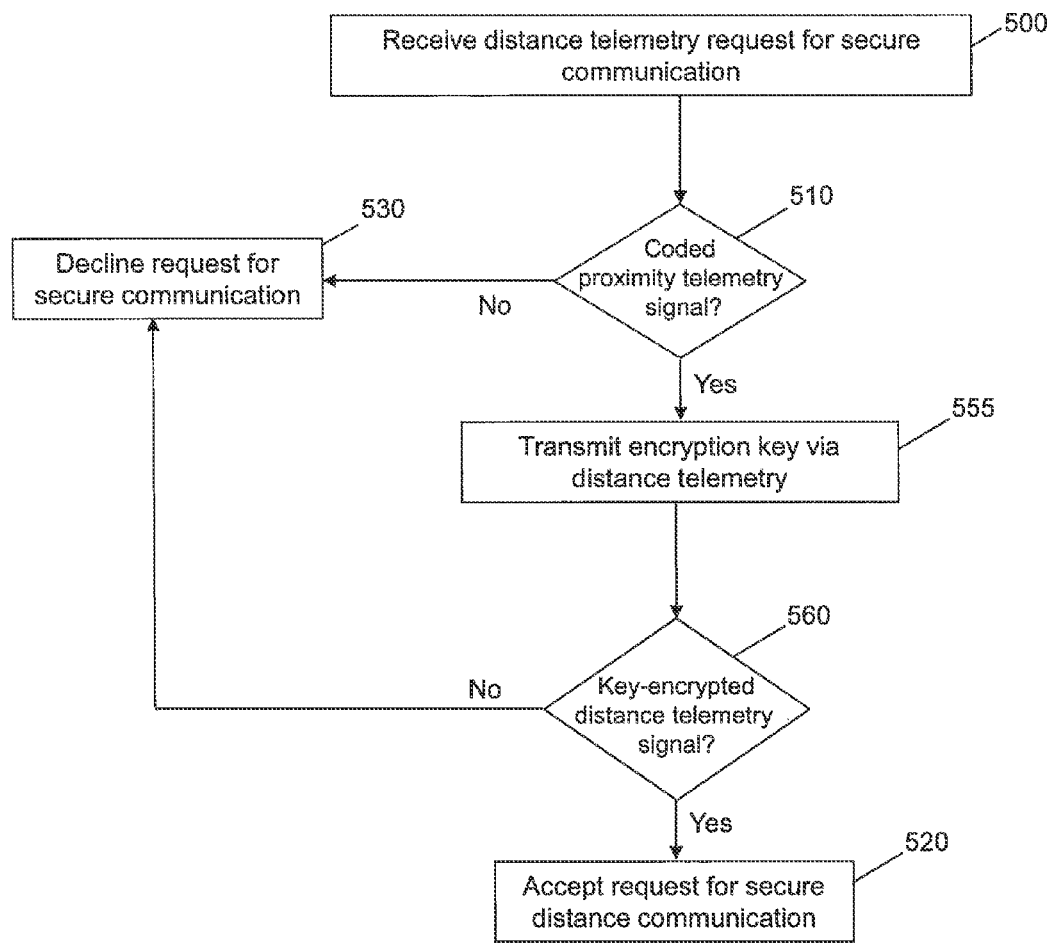
Figure 11:
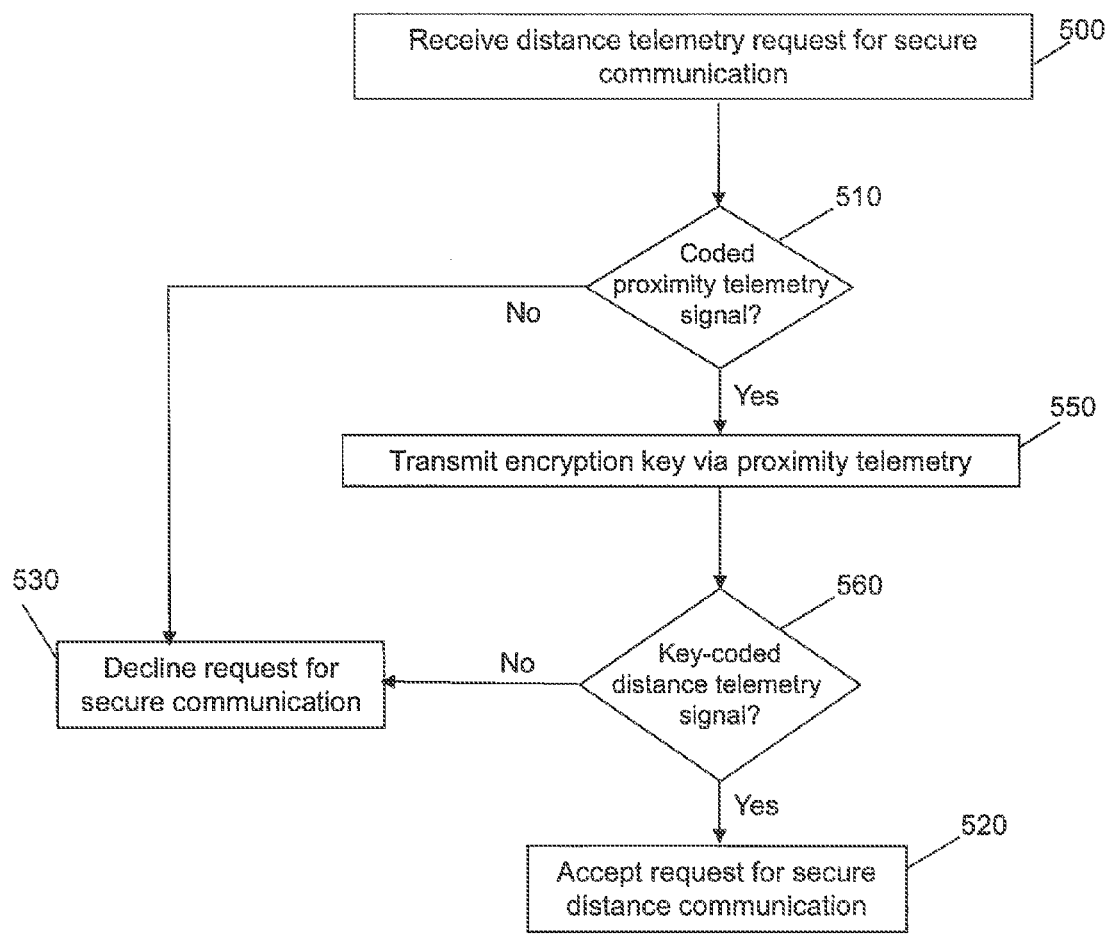

An additional representative method that will reduce the likelihood of unintended communication as described with regard to the scenario depicted in FIG. 3 is shown in the flow diagram of FIG. 10. As described with regard to FIG. 7, a distance telemetry request for secure communication may be received (500) and implantable device 110 may then determine whether a coded proximity telemetry signal is being received (510). If so, implantable device 110 may transmit an encryption key via distance telemetry (555) and determine whether a distance telemetry signal with information encrypted according to the key is being received (560), as described above with regard to FIG. 9. If both the coded proximity telemetry signal and the key encrypted distance telemetry signal are being received, the implantable medical device 110 may accept the request for secure distance telemetry (520). Otherwise, the implantable device 530 may decline the request for secured distance telemetry (530).

For additional security, both the transfer of an encryption key via proximity telemetry (e.g., as discussed with regard to FIG. 9) and the transmission of a coded signal via proximity telemetry (e.g., as discussed with regard to FIGS. 7 and 8) may be employed. For example and referring to FIG. 11, upon receipt of a distance telemetry request for secure communication (500), implantable device 110 may determine whether a properly coded proximity signal is being received (510). If a properly coded proximity signal is being received, the implantable device 110 may transmit an encryption key via proximity telemetry (550). The external device 10 may encrypt information sent via distance telemetry with the appropriate key, and the implantable device 110 may determine whether it is receiving properly encrypted information via distance telemetry (560). If so, secure distance communication may be established between the implantable device 110 and the external device 10. If either the properly coded proximity signal is not received or the properly encrypted distance telemetry signal is not received, the implantable device 110 may decline the request for secure distance communication (530).

One of skill in the art will understand that components or steps described herein regarding a given embodiment or set of embodiments may readily be omitted, substituted, or added from, with, or to components or steps of other embodiments or sets of embodiments, as appropriate or desirable. It will be further understood that a computer readable medium containing instructions that when implemented cause an implantable medical device or external device to perform the methods described herein are contemplated.

Thus, embodiments of PROXIMITY SIGNATURE FOR SECURE COMMUNICATION WITH IMPLANTABLE MEDICAL DEVICE are disclosed. One skilled in the art will appreciate that various aspects of the present disclosure can be practiced with embodiments other than those disclosed. The disclosed embodiments are presented for purposes of illustration and not limitation, and the present invention is limited only by the claims that follow.

What is claimed is:

1. A method of establishing secure communication between an implantable medical device and an external device, the method being performed by the implantable medical device and comprising:
   determining, via a processor, whether a coded proximity telemetry signal is being received by a proximity telemetry module;
   transmitting, via distance telemetry by a distance telemetry module, information regarding an encryption key;
   determining, via the processor, whether a distance telemetry communication containing information encrypted according to the encryption key is being received; and
   establishing secure distance communication with the external device via the processor if the distance telemetry communication contains information encrypted according to the encryption key.

2. The method of claim 1, further comprising declining to establish secure distance communication with the external device if the distance telemetry communication does not contain information encrypted according to the encryption key.

3. The method of claim 1, wherein transmitting, via distance telemetry by a distance telemetry module, information regarding an encryption key comprises transmitting the encryption key.

4. The method of claim 1, wherein determining whether a coded proximity telemetry signal is being received comprises determining whether the coded proximity telemetry signal matches a coding signature.

5. The method of claim 1, wherein determining whether a coded proximity telemetry signal is being received comprises determining at least one of a clock rate, a duty cycle, and an on-off key rate of the coded proximity telemetry signal.

6. The method of claim 1, wherein determining whether a coded proximity telemetry signal is being received comprises comparing the coded proximity telemetry signal to one or more stored signatures.

7. The method of claim 1, wherein determining whether a coded proximity telemetry signal is being received comprises determining whether information received via distance telemetry matches the coding of the coded proximity telemetry signal.

8. The method of claim 1, wherein the coded proximity telemetry signal comprises a coded magnetic field.

9. The method of claim 1, wherein transmitting, via distance telemetry by a distance telemetry module, information regarding an encryption key comprises transmitting, via distance telemetry, information regarding an encryption key in response to determining that a predetermined coded proximity telemetry signal is being received.

10. The method of claim 1, further comprising receiving a request for secure distance communication that includes information regarding the code of the coded proximity telemetry signal.

11. An implantable medical device, comprising:
   a receiver module;
   a transceiver module configured to transmit, via distance telemetry, information regarding an encryption key; and
   a processor configured to:
      determine whether a coded proximity telemetry signal is being received from another device by the receiver module,
      determine whether a distance telemetry communication containing information encrypted according to the encryption key is being received from the other device, and
      establish secure distance communication with the other device if the second distance telemetry communication contains information encrypted according to the encryption key.

12. The implantable medical device of claim 11, wherein the transceiver module is a radio frequency transceiver module.

13. The implantable medical device of claim 11, wherein the receiver module is an inductive receiver module.

14. The implantable medical device of claim 11, wherein the processor is configured to compare signals obtained from the transceiver module to signals obtained from the receiver module to determine whether the coded proximity telemetry signal is being received.

15. The implantable medical device of claim 11, wherein the processor is configured to compare signals received by the receiver module to stored signatures to determine whether the coded proximity telemetry signal is being received.

16. The implantable medical device of claim 11, wherein the transceiver module is configured to transmit the encryption key.

17. A system, comprising:
   an external device; and
   an implantable medical device, comprising:
      a receiver module;
      a transceiver module configured to transmit, via distance telemetry, information regarding an encryption key to the external device; and
      a processor configured to:
         determine whether a coded proximity telemetry signal is being received from the external device by the receiver module, determine whether a distance telemetry communication containing information encrypted according to the encryption key is being received from the external device, and establish secure distance communication with the external device if the distance telemetry communication contains information encrypted according to the encryption key.

18. The system of claim 17, wherein the external device comprises a programming device configured to program the implantable medical device.

19. The system of claim 17, wherein the external device comprises a radio frequency transceiver module configured to transmit the distance telemetry communication.

20. The system of claim 17, wherein the external device comprises an inductive transmitter module configured to transmit the coded proximity telemetry signal.

\* \* \* \* \*